United States Patent [19]

Klibanov

[11] Patent Number: 4,623,465

[45] Date of Patent: Nov. 18, 1986

[54] REMOVAL OF COMBINED ORGANIC SUBSTANCES FROM AQUEOUS SOLUTIONS

[75] Inventor: Alexander M. Klibanov, Boston, Mass.

[73] Assignee: Massachusetts Institute of Technology, Cambridge, Mass.

[21] Appl. No.: 793,484

[22] Filed: Oct. 29, 1985

Related U.S. Application Data

[63] Continuation of Ser. No. 255,880, Apr. 20, 1981, abandoned.

[51] Int. Cl.$^4$ ............................................. C02F 1/54
[52] U.S. Cl. ................................... 210/632; 210/721; 210/728; 210/759; 210/909; 435/192; 435/262
[58] Field of Search ............... 210/606, 631, 632, 721, 210/759, 909, 917, 725, 728, 727, 729, 730; 435/41, 192, 262, 264

[56] References Cited

U.S. PATENT DOCUMENTS

| 1,844,018 | 2/1932 | Sailer | 435/192 |
| 4,294,703 | 10/1981 | Wilms et al. | 210/759 |
| 4,485,016 | 11/1984 | Hopkins | 210/632 |

FOREIGN PATENT DOCUMENTS

| 646440 | 8/1962 | Canada | 210/759 |
| 4055530 | 5/1979 | Japan | 210/759 |
| 2070580 | 9/1981 | United Kingdom | 210/632 |

OTHER PUBLICATIONS

Klibanov et al., "Horseradish Peroxidase for the Removal of Carcinogenic Aromatic Amines from Water", *Enzyme Microb. Tech.* Apr., 1981, pp. 119-122.

Saunders et al., *Peroxidase* Butterworths (Wash. D.C.) 1964, pp. 10-27 & 38.

Galliani et al. "Horseradish Peroxidase Catalysed Oxidation of Aromatic Tertiary Amines with $H_2O_2$", J.C.S Perkin Trans I, 1978, pp. 456-460.

Baker et al., "Studies in Peroxidase Action Part 25 Stereospecificity of Peroxidase Action," *Tetrahedron,* 1975, pp. 1869-1872.

Danner et al. "The Oxidation of Phenol & Its Reaction Product by Horseradish Oxidase & $H_2O_2$," *Arch. Biochem. Biophys.,* 156, 1973, pp. 759-763.

Brignac et al. "Oxidation of Guaiacol, Serotonin, O–Cresol, P–Cresol, M–Cresol, Homovanillic Acid, & M–Tyrosine by Horseradish Peroxidase & $H_2O_2$," *Anal. Lett.,* 8, 1975, pp. 315-322.

Hughes et al., *J.C.S,* 1956, p. 3814.

Young et al., "Peroxidase Catalysed Oxidation of Naturally Occuring Phenols & Hardwood Lignins," *Phytochemistry,* 1973, pp. 2851-2861.

Primary Examiner—Peter Hruskoci
Attorney, Agent, or Firm—Hamilton, Brook, Smith & Reynolds

[57] ABSTRACT

A method is disclosed for removing organic substances, such as phenols and aromatic amines, from aqueous solutions by adding chemicals, such as peroxidase enzymes and peroxide substrates, to such solutions. A surprising discovery is that the presence of more than one organic substance greatly increases the efficiency of precipitation of substances that do not precipitate efficiently in the absence of other organic substances.

11 Claims, No Drawings

REMOVAL OF COMBINED ORGANIC SUBSTANCES FROM AQUEOUS SOLUTIONS

The invention described herein was made in the course of or under grants from the Sea Grant program of the National Oceanic and Atmospheric Administration.

This is a continuation of co-pending application Ser. No. 255,880 filed on Apr. 20, 1981 now abandoned.

TECHNICAL FIELD

This invention is in the field of chemistry, biochemistry, and water pollution control.

BACKGROUND ART

Many phenolic compounds and aromatic amines are present in the effluents of chemical and dye manufacturers, coal processors, resin and plastic manufacturers, textile processors, and other industries. Since most phenols and aromatic amines are toxic and many are potentially carcinogenic, they must be removed from effluents in which they are present. Existing methods for the removal of phenols and aromatic amines from water include adsorption, extraction, microbial and chemical oxidation, electrochemical techniques, and irradiation. However, all of these methods suffer from serious shortcomings such as high cost, incompleteness of purification, formation of hazardous byproducts, and low efficiency. See, e.g., M. W. Slein et al, *Degradation of Chemical Carcinogens*, Van Nostrand Reinhold Co., 1980; *Cleaning our Environment—A Chemical Perspective*, American Chemical Society, 1978. Therefore, alternative methods of removing aromatic compounds from waste water are highly desirable.

Peroxidases are enzymes that catalyze chemical reactions that normally involve the transfer of hydrogen radicals from organic substances to substrates comprising peroxides. Such reactions may be complex, and may involve many different substances. However, the following simplified example explains the major functions performed by several substances in one such reaction. Horseradish peroxidase reacts with phenol by removing a hydrogen radical (one proton with one electron) from the hydroxide group on the phenol. The phenol is thereby converted to an aromatic free radical, which participates in a subsequent reaction that depends upon other substances that are present in the solution. The hydrogen radical reacts with hydrogen peroxide to form water.

The addition of both peroxide and peroxidase to an aqueous solution containing certain phenols or aromatic amines has long been recognized to cause color changes and precipitation of the aromatic compounds. Most of the work done to date involving peroxidase reactions with aromatic compounds has involved either: (1) the use of peroxidase as an indicator to determine whether phenols or aromatic amines are present in a solution: (2) research into the exact chemical reactions and products created. See, e.g., P. J. G. Mann et al, *Proceedings of the Royal Society B*119, p. 47 (1935); B. C. Saunders et al, *Peroxidase*, p. 10 et seq., Butterworth's (1964); A. Klibanov et al, "Horseradish peroxidase for the removal of carcinogenic aromatic amines from water," *Enzyme Microb. Technol.* Vol. 3, pp. 119-122 (1981); G. Galliani et al, "Horseradish Peroxidase-catalyzed Oxidation of Aromatic Tertiary Amines with Hydrogen Peroxide," *J. Chem. Soc. Perkin I* pp. 456-460 (1980). Each of these works deals with the reaction of a single aromatic substance in aqueous solution.

Aromatic free radicals are relatively reactive. The creation of aromatic free radicals in an aqueous solution tends to commence a chain reaction whereby aromatic molecules become bonded together to form an insoluble precipitate which can be removed from solution by sedimentation, filtration, centrifugation, or other conventional techniques. The efficiency of this technique varies between aromatic substances. For example, research by the Applicant indicates that removal efficiencies for various phenolic compounds under comparable conditions ranged from 53.5% efficiency for ortho-aminophenol and 85.3% for phenol, to 99.8% for ortho-chlorophenol. Removal efficiencies for various aromatic amines under comparable conditions ranged from 62.5% for 4-chloroaniline and 72.9% for aniline to 98.6% for meta-phenylenediamine. Such efficiencies are assessed by measuring the aromatic content of the water before the addition of peroxidase and peroxide, and after removal of the resulting precipitate, by spectrophotometric or other analytical methods.

The economic feasibility of peroxidase enzyme treatment to remove aromatic compounds from water depends upon the extent of polymerization and precipitation of the compounds. Since enzymes and peroxides tend to be relatively expensive, the usage of peroxidase and peroxide to treat large volumes of wastewater would not be feasible unless the compounds were removed to a very high degree. Since phenol, aniline and many other aromatic compounds are not removed to a high degree of efficiency by peroxidase treatment, it appeared to persons skilled in the art that peroxidase treatment was not an economically feasible method of treating most forms of wastewater.

DISCLOSURE OF THE INVENTION

This invention relates to the use of chemicals to remove aromatic pollutants from wastewater and other aqueous solutions. It has been discovered that if a peroxide and a peroxidase enzyme are added to an aqueous solution, then the chemical interactions between two or more aromatic substances cause the aromatic substances to precipitate to a surprisingly greater degree than the precipitation that would occur if only one aromatic substance was present in solution.

For example, phenol is removed from water with about 75% efficiency by horseradish peroxidase and peroxide at pH 5.5 and room temperature. However, when another aromatic compound such as orthodianisidine, benzidine, or 8-hydroxyquinoline is added to the phenol, then the phenol and the other aromatic substance are both removed from solution with better than 99.5% efficiency. Similarly, orthoaminophenol is removed from water by horseradish peroxidase and peroxide with less than 50% efficiency. However, if 2,3-dimethylphenol or 2,7-naphthalenediol is added to the solution, then the removal efficiency of the ortho-aminophenol is increased to more than 95%.

Many industrial wastewater streams contain a variety of aromatic pollutants, many of which do not precipitate efficiently unless other aromatic pollutants are present. Therefore, peroxidase enzymes used in conjunction with peroxide in the treatment of wastewater can achieve surprisingly high removal of all of the aromatic compounds from the water. This unexpected result allows enzymatic treatment of wastewater to become an economically feasible and potentially superior method of wastewater treatment.

Another surprising and useful discovery is that the chemical reactions involved in this invention are relatively independent of temperature. For example, enzymatic removal of phenols from industrial wastewater at 4° C. produced results (over 95% efficiency) that were virtually the same as similar treatment at room temperature. By contrast, bacterial degradation of most pollutants, including phenols, proceeds very slowly at 4° C.

This invention relates to interactions between aromatic substances that cause them to precipitate with high efficiency when free radicals are created on one or more of the substances. The creation of such free radicals can be caused by various methods other than the use of enzymes with appropriate substrates. For example, it is well known that the addition of certain transition metals and hydrogen peroxide to an aqueous solution containing aromatic substances can cause the creation of free radicals on certain aromatic substances. Such free radicals can interact with other aromatic substances in basically the same way that aromatic free radicals created by enzymes react with other aromatic substances. Therefore, the scope of this invention includes all chemical methods of creating free radicals on aromatic substances in aqueous solutions, wherein the interactions between two or more aromatic substances causes at least one aromatic substance to be incorporated into an insoluble precipitate with a substantially higher degree of efficiency than would occur if that aromatic substance were the only aromatic substance in the aqueous solution.

BEST MODE OF CARRYING OUT THE INVENTION

In one preferred embodiment of this invention, horseradish peroxidase and hydrogen peroxide were used to treat a sample of industrial wastewater from a chemical company's effluent stream. Analysis indicated that the wastewater contained 106 mg/l of phenolic compounds. One mg/l of horseradish peroxidase and 2.5 mM of hydrogen peroxide were added to the wastewater. The solution was mixed by stirring, and allowed to stand at room temperature for 24 hours. A brown mass of precipitate formed in the solution. The supernatant was removed by decanting. Spectrophotometric measurement indicated that the supernatant contained 5 mg/l of phenolic compounds. The peroxidase treatment removed over 95% of the phenolic compounds from the water. The same results were obtained for wastewater treated at 4° C.

This invention is not limited to the removal of phenols and aromatic amines from wastewater, but can also be used to remove other aromatic and other organic compounds. For example, certain compounds such as naphthalene do not react directly with peroxidase and peroxide to create free radicals. However, if free radicals are created by the action of peroxidase on other substances, those free radicals are capable of reacting with naphthalene and other such compounds, binding them within the polymerized precipitate and thereby removing them from an aqueous solution. Non-aromatic organic substances may be removed from water by this invention to the extent that they are capable of participating in a polymerization reaction involving free radicals. Such non-aromatic substances may be directly affected by enzymes, or by free radicals on other substances.

This invention is not limited to the treatment of industrial wastewaters. Any source or quantity of water that contains a combination of appropriate organic substances may be treated chemically according to this invention to remove such substances.

This invention is not limited to the enzyme horseradish peroxidase. Other types of enzymes, including but not limited to lactoperoxidase and chloroperoxidase, are also suitable for use in this invention. The specific form of enzyme that is most suitable for the removal of organic compounds from water may be determined through routine experimentation by someone skilled in the art. In addition, more than one enzyme may be added to water to improve the removal efficiency of aromatic substances.

This invention is not limited to the use of hydrogen peroxide as a substrate to accept hydrogen radicals that are removed from organic compounds. Any form of peroxide or other compound that is capable of accepting such hydrogen radicals may be suitable for use in this invention. The optimal substrate for use with a specific combination of organic compounds in aqueous solution may be determined through routine experimentation by someone skilled in the art.

An important variation of this invention involves the addition of an aromatic or other organic substance to water to promote the precipitation of other organic or aromatic substances. For example, if phenol is the only organic pollutant present in an effluent stream, it would not be efficiently removed from the effluent by the addition of appropriate enzymes and substrates. However, if a second aromatic substance, such as orthodianisidine, benzidine, or hydroxyquinoline was added to the phenolic effluent, then it would promote the nearly complete precipitation and efficient removal of both impurities. An appropriate second substance might be added to effluent in this fashion either by adding a relatively pure chemical to the effluent, or by mixing the effluent with any other source of the second substance, including a second effluent stream from which the second substance must be removed. This invention thereby allows for the efficient treatment of a mixture of effluent streams, none of which is suitable for enzymatic treatment according to this invention unless mixed with other effluent streams containing different organic substances. The optimal conditions and procedures for adding a second organic substance to an effluent, or for mixing effluent streams, may be determined through routine experimentation by someone skilled in the art.

This invention is not limited to the use of enzymes with substrates to catalyze the formation of free radicals on aromatic or other organic substances. Any chemical treatment of an aqueous solution that enhances the creation of free radicals on organic substances in the solution may be used according to this invention to enhance the precipitation of at least one organic substance that would not precipitate efficiently in the absence of other suitable organic substances. For example, certain transition metals in combination with hydrogen peroxide catalyze the formation of free radicals on certain organic substances. Therefore, such treatment of an aqueous solution containing a combination of organic substances is within the scope of this invention if the precipitation efficiency of at least one organic substance is greatly enhanced by interactions with at least one other organic substance.

EXAMPLES

EXAMPLE 1

Removal of Phenol from Water

An aqueous solution of phenol was created by mixing 0.1 gram per liter of phenol in distilled water. The pH was adjusted to 5.5 by the addition of a 10 mM phosphate buffer. One purpurogallin unit per ml of horseradish peroxidase (EC 1.11.1.7, purchased from Sigma Chemical Co. as a salt-free powder with a specific activity of 175 purpurogallin units per ml (II)) was added to the solution. One mM of hydrogen peroxide (30% solution in water, purchased from Mallinkrodt) was also added to solution. The solution was mixed and allowed to stand at room temperature for three hours. The resulting precipitate was removed by centrifugation. The supernatant was assayed spectrophotometrically, using the method described by E. Emerson, *J. Org. Chem* 8: 417–428 (1943), modified by the addition of 5 ml/l of 6M ammonium hydroxide, 5 ml/l of 2% aminoantipyrine, and 10 ml/l of 8% potassium ferricyanide. 0.0264 gram/l of phenol remained in solution, indicating a removal efficiency of 74.6%.

EXAMPLE 2

Removal of Several Aromatic Substances from Water

Three samples of aqueous solution of phenol, peroxide, peroxidase and buffer were created as described in Example 1. 0.1 g/l of ortho-dianisidine, benzidine, or 8-hydroxyquinoline was added to each sample. Each solution was mixed and allowed to stand at room temperature for three hours and centrifuged to remove the resulting precipitate. The supernatant was analyzed as described above; para-substituted phenols were analyzed by direct spectrophotometric measurement at 280–310 nm. Table 1 indicates the removal efficiency of the phenol alone, as described in Example 1, and of the phenol mixture when an additional aromatic compound was present. In each case, the additional aromatic compound increased the overall removal efficiency from 74.6% to 99.5% or higher.

TABLE 1

PEROXIDASE REMOVAL OF PHENOL WITH AND WITHOUT OTHER COMPOUNDS

| Pollutant | Additional Pollutant | Removal Efficiency % of Phenol |
|---|---|---|
| Phenol | None | 74.6 |
| Phenol | o-Dianisidine | 99.7 |
| Phenol | Benzidine | 99.5 |
| Phenol | 8-Hydroxyquinoline | 99.8 |

EXAMPLE 3

Removal of Aminophenol from Water

An aqueous solution of ortho-aminophenol was created by mixing 0.1 g/l of o-aminophenol and distilled water. One unit/ml of peroxidase and 2.5 mM $H_2O_2$ were added to the solution. 10 mM acetate buffer was added to maintain the pH at 4.0. The solution was mixed and allowed to stand three hours at room temperature, and centrifuged to remove the resulting precipitate. The supernatant was analyzed spectrophotometrically, using the methods of L. Butt and N. Strafford, *J. Appl. Chem.* 6: 525–538 (1956), modified by the addition of 80 ml/l of 1M HCl, 32 ml/l of 0.5 M sodium nitrite, 20 ml/l of 6 grams of 1-naphthol per liter of ethanol, and 400 ml/l of 1M sodium carbonate. Aromatic amines were also assayed using direct spectrophotometric measurement at 280–300 nm. 0.0514 g/l of o-aminophenol remained in the solution, indicating a removal efficiency of 48.6%.

EXAMPLE 4

Removal of Several Aromatic Substances from Water

Four samples of aqueous solution of o-aminophenol, peroxidase and hydrogen peroxide at pH 4.0 were created as described in Example 3. One of the following additional aromatic compounds was added to each sample, in the concentration of 0.1 g/l: 2,3-dimethylphenol, p-phenylphenol, 1-naphthol, or 2,7-naphthalenediol. The removal efficiency of each is indicated in Table 2.

TABLE 2

PEROXIDASE REMOVAL OF o-AMINOPHENOL WITH AND WITHOUT OTHER COMPOUNDS

| Pollutant | Additional Pollutant | Removal Efficiency % of o-Aminophenol |
|---|---|---|
| o-Aminophenol | None | 48.6 |
| o-Aminophenol | 2,3-Dimethylphenol | 95.1 |
| o-Aminophenol | p-Phenylphenol | 92.0 |
| o-Aminophenol | 1-Naphthol | 84.9 |
| o-Aminophenol | 2,7-Naphthalenediol | 95.3 |

EXAMPLE 5

Treatment of Industrial Wastewater

Samples of wastewater containing various phenols, phosphates and other pollutants were obtained from a chemical plant. Before shipping, the wastewater was treated with about 0.5 g/l $CuSO_4$, and the pH was adjusted to 4 by $H_3PO_4$, to prevent bacterial decomposition of phenols during shipping. Upon receipt, the pH was increased to 7 by adding NaOH. The wastewater, analyzed by the methods described in Examples 1 and 2, contained about 105 mg/l of various phenols. One mg/l of horseradish peroxidase and 2.5 mM of $H_2O_2$ were added to the wastewater. The mixture was stirred, and allowed to stand at room temperature for 24 hours. A brown precipitate formed and was removed by filtration. The filtrate contained about 5 mg/l of various phenols. The removal efficiency of the treatment process was 95.2%.

EXAMPLE 6

Treatment of Wastewater at 4° C.

The procedures described above were repeated on wastewater that was chilled to 4° C. The treatment removed 94.7% of the phenols from the water.

Industrial Applicability

The invention described herein has industrial applicability in the removal of aromatic and other organic substances from aqueous solution. This invention is particularly useful for the treatment of industrial wastewater which contains a combination of phenols or aromatic amines.

Equivalents

Those skilled in the art will recognize, or be able to ascertain using no more than routine experimentation, many equivalents to the specific embodiments of the invention described herein. Such equivalents are intended to be encompassed by the following claims.

I claim:

1. A process for removing a first aromatic organic compound from an aqueous solution, comprising the following steps:
   a. adding a second aromatic organic compound to said aqueous solution, said second aromatic organic compound comprising a hydroxy- or amine-substituted aromatic compound;
   b. adding an enzyme to said aqueous solution;
   c. adding a substrate for said enzyme to said aqueous solution;
   d. allowing sufficient time for said first and second organic compounds to form a precipitate; and,
   e. removing said precipitate from said aqueous solution.

2. An improvement of claim 1 wherein said enzyme is a peroxidase.

3. An improvement of claim 2 wherein said substrate is hydrogen peroxide.

4. An improvement of claim 3 wherein said second organic compound comprises a phenol.

5. An improvement of claim 3 wherein said second organic compound comprises an aromatic amine.

6. A method of enhancing the removal of a multiplicity of organic substances including an aromatic substance from an aqueous solution, comprising adding at least one enzyme and at least one substrate to said solution, thereby catalyzing the formation of an insoluble precipitate of said multiplicity of organic substances, wherein the precipitation of said aromatic substance is enhanced by the addition of at least one other organic substance comprising a hydroxy- or amine-substituted aromatic compound, and removing said precipitate from said aqueous solution.

7. The method of claim 6 wherein the formation of said insoluble precipitate is catalyzed by the formation of free radicals on at least one of said organic substances.

8. The method of claim 6 wherein said enzyme comprises peroxidase and said substrate comprises peroxide.

9. The method of claim 8 including the further step of adding transition metals in combination with said peroxide.

10. In the method of removing an aromatic organic compound from an aqueous solution by adding an enxyme and a substrate for said enzyme to the aqueous solution to cause the aromatic organic compound to form a precipitate:
    the improvement comprising adding a hydroxy- or amine-substituted aromatic compound to the aqueous solution to enhance formation of the precipitate of the aromatic organic compound.

11. The improvement of claim 10 wherein said enzyme is a peroxidase and said substrate is a peroxide.

* * * * *